United States Patent
Ertas

(10) Patent No.: US 8,083,413 B2
(45) Date of Patent: Dec. 27, 2011

(54) COMPLIANT HYBRID GAS JOURNAL BEARING USING INTEGRAL WIRE MESH DAMPERS

(75) Inventor: Bugra Han Ertas, Albany, NY (US)

(73) Assignee: General Electric Company, Niskayuna, NY (US)

( * ) Notice: Subject to any disclaimer, the term of this patent is extended or adjusted under 35 U.S.C. 154(b) by 1322 days.

(21) Appl. No.: 11/876,813

(22) Filed: Oct. 23, 2007

(65) Prior Publication Data

US 2009/0304313 A1 Dec. 10, 2009

(51) Int. Cl.
 *F16C 27/06* (2006.01)
(52) U.S. Cl. ........... 384/117; 384/99; 384/119; 384/312
(58) Field of Classification Search .......... 384/99, 384/114, 117, 119, 215, 224, 308–309, 311–312; 494/82–83
See application file for complete search history.

(56) References Cited

U.S. PATENT DOCUMENTS

| | | | | |
|---|---|---|---|---|
| 3,318,642 A | * | 5/1967 | Peterson | 384/215 |
| 3,639,014 A | * | 2/1972 | Sixsmith | 384/114 |
| 3,887,245 A | * | 6/1975 | Rouch | 384/306 |
| 3,891,281 A | * | 6/1975 | Jenness | 384/311 |
| 4,385,787 A | * | 5/1983 | Reisenweber et al. | 384/114 |
| 4,460,283 A | * | 7/1984 | Yoshioka et al. | 384/119 |
| 4,515,486 A | * | 5/1985 | Ide | 384/308 |
| 4,623,810 A | * | 11/1986 | Smith | 384/278 |
| 4,676,668 A | * | 6/1987 | Ide | 384/117 |
| 5,201,585 A | * | 4/1993 | Gans et al. | 384/99 |
| 5,288,153 A | * | 2/1994 | Gardner | 384/311 |
| 5,328,408 A | * | 7/1994 | Wolf et al. | 464/180 |
| 5,603,574 A | | 2/1997 | Ide et al. | |
| 5,743,654 A | | 4/1998 | Ide et al. | |
| 6,091,175 A | * | 7/2000 | Kinsinger | 384/119 |
| 6,224,533 B1 | * | 5/2001 | Bengtsson et al. | 494/82 |
| 6,379,046 B1 | | 4/2002 | Zeidan | |
| 6,527,446 B2 | * | 3/2003 | Lee et al. | 384/99 |
| 6,566,774 B2 | * | 5/2003 | Parmeter et al. | 310/90 |
| 6,630,761 B1 | | 10/2003 | Gabrys | |
| 6,695,478 B2 | | 2/2004 | Bos et al. | |
| 6,747,378 B2 | * | 6/2004 | Brackett | 384/582 |
| 7,679,245 B2 | * | 3/2010 | Brackett et al. | 310/90.5 |
| 7,780,424 B2 | * | 8/2010 | Parmeter et al. | 417/423.3 |

* cited by examiner

*Primary Examiner* — Marcus Charles
(74) *Attorney, Agent, or Firm* — Penny A. Clarke

(57) ABSTRACT

A compliant hybrid gas journal bearing includes compliant hybrid bearing pads having a hydrostatic recess and a capillary restrictor for providing a flow of pressurized gas to the bearing. The bearing also includes an inner rim adjacent the bearing pads, an outer rim and a damper bridge between the inner and outer rims. The damper bridge has an axial length that is less than an axial length of the bearing pads and the outer rim to form a damper cavity on each side of the damper bridge. An integral wire mesh damper is situated within the damper cavity on each side of the damper bridge. Integral centering springs are located between the inner and outer rims to provide radial and rotational compliance to the bearing pads. The oil-free bearing design addresses the low damping and low load capacity characteristics that are inherent in present day compliant air foil bearing designs, while retaining the compliance to changes in rotor geometry.

24 Claims, 2 Drawing Sheets

COMPLIANT HYBRID GAS JOURNAL BEARING USING INTEGRAL WIRE MESH DAMPERS

BACKGROUND

The invention relates generally to a bearing, and in particular to a compliant gas bearing that uses integral wire mesh dampers.

High speed equipment, such as aircraft engine turbomachinery, and aero-derivative applications, such as steam turbines, gas turbines and compressors, must pass through several natural frequencies or critical speeds before reaching the design operating speed. When a system operates at its natural frequency or critical speed, the system/rotor vibration amplitudes become large. These vibrations, stemming from rotor imbalance can be destructive or even catastrophic if not adequately dampened. Bearings with adequate damping characteristics limit or damp out the synchronous vibrations to allow the equipment to safely pass through the critical speeds. Furthermore, good bearing damping contributes to rotor dynamic stability at high speeds by suppressing subsynchronous excitation of rotor natural frequencies.

Fluid or oil film journal bearings have long been used to dampen the vibration created by turbomachines. Rotors in aircraft gas turbine engines and industrial centrifugal compressors often use oil-based squeeze film damper bearings supported by squirrel cage centering springs to control vibration amplitudes. In a fluid film bearing, a thin fluid film forms a buffer between the rotating journal surface and the stationary bearing surface, and dampens vibration from the rotor. In a squeeze film damper bearing, a thin film of fluid in the form of a liquid, usually oil, is squeezed by two non-rotating cylindrical surfaces. One surface is stationary while the other is positioned by a centering spring structure and orbits with the motion of the rotor. The squeezing of the fluid film in results to the orbital rotor motion dampens rotor vibration through the bearing support.

The simplest squeeze film damper bearing design does not include a centering spring. The outer race of a rolling element bearing, or the outer bearing shell in the case of a fluid film bearing, is allowed to float and presses in a clearance space between the bearing outer diameter and the housing inner diameter. The absence of a mechanical centering spring in this design configuration means that the damper journal will be bottomed out at start-up. As the speed increases and the shaft starts to rotate, the damper's journal (bearing shell outer surface) will lift off. The oil film in a squeeze film damper does not produce direct stiffness like conventional fluid film bearings. However the damper does develop direct stiffness-like behavior. This direct stiffness is due to the cross-coupled damping coefficients, which exhibit stiffness-like (spring) characteristics.

The non-centered damper is one of the most non-linear of the squeeze film damper designs. There are two basic mechanisms that are responsible for this non-linear behavior. The first of the two non-linear mechanisms is attributed to the non-linear characteristics produced by the cross-coupled damping coefficients. The second source of non-linear behavior present with this type of damper comes as a direct consequence of the bottoming out of the damper journal.

The simplest means of providing a centering spring in a squeeze film damper is through the use of elastomer O-rings. The advantages of this design stem from its simplicity, ease of manufacture, and the ability to incorporate the damper into small envelopes. Some of the disadvantages with this design are attributed to the limited range of stiffness that can be achieved with elastomers. Predicting the stiffness with a good degree of certainty is difficult in elastomeric materials due to the material variance, and the influence of temperature and time on its properties. The O-ring design is also susceptible to creep, causing the damper to bottom out, which, as discussed above, may lead to a bi-linear spring behavior.

The most common used squeeze film damper design, particularly in aircraft engines, is the squirrel cage supported damper. A distinctive feature necessary with such a design is the relatively large axial space required in comparison to the damper length. This is one of the major drawbacks of this damper design. The squirrel cage forming the centering spring for the damper quite often requires three to four times as much axial space as the damper itself.

Assembling the squirrel cage spring and centering the journal within the clearance space requires special tools and skills. The squirrel cage spring also complicates the damper end seal design and assembly. It is also very difficult to offset the spring assembly, in order to account for the gravity load due to the shaft weight. Maintaining parallelism between the damper journal and housing is another factor that adds uncertainty and complications to this design.

Another oil-based squeeze film damper design includes an integral damper centering spring. In this design, cantilevered support ribs, along with the sector they are supporting at both ends, form a centering spring element. A small gap between the sector and the outer ring forms the squeeze film damper clearance space. Unlike the squirrel cage spring design, the integral damper centering spring design does not occupy any additional axial space beyond the existing length occupied by the bearing. The complete assembly may contain any number of sectors, depending on the load and required stiffness and damping for the particular application. Wire electric discharge machines (EDM) provide an excellent means of obtaining the desired clearance with very high precision and repeatability maintaining excellent parallelism between the damper journal and housing.

Despite the advantages offered by these squeeze film bearing constructions, oil lubricated bearings impose a much higher cost and maintenance load as well as reliability problems associated with oil leakage, filtering and conduits. These and other drawbacks of oil lubricated bearings have led industry to seek to develop a compliant air foil bearing. However, present day air foil technology has been primarily limited to small lightweight rotors and machines, namely air cycle machines (ACM) on aircraft. Thus, while the benefits of incorporating air bearings into on aircraft are well understood, significant technical challenges have to be overcome to develop a practical design. These challenges include developing a gas bearing with the load capacity and damping that is significantly higher than the present day air foil bearing technology.

BRIEF DESCRIPTION

Briefly, a compliant hybrid gas journal bearing comprises a plurality of compliant hybrid bearing pads; an inner rim adjacent the plurality of bearing pads, an outer rim and a damper bridge radially and concentrically interposed between the inner and outer rims, the damper bridge having an axial length that is less than an axial length of the plurality of bearing pads and the outer rim, thereby forming a damper cavity on each side of the damper bridge; and an integral wire mesh damper situated within the damper cavities on each side of the damper bridge.

In another aspect of the invention, a compliant hybrid gas journal bearing comprises a plurality of compliant hybrid bearing pads, at least one bearing pad including a hydrostatic recess and a capillary restrictor for providing a flow of pressurized gas; and an inner rim adjacent the plurality of bearing pads, an outer rim and a damper bridge radially and concentrically interposed between the inner and outer rims, the damper bridge having an axial length that is less than an axial length of the plurality of bearing pads and the outer rim, thereby forming a damper cavity on each side of the damper bridge.

In yet another aspect of the invention, a compliant hybrid gas journal bearing comprises a plurality of compliant hybrid bearing pads, at least one bearing pad including a hydrostatic recess and a capillary restrictor for providing a flow of pressurized gas; an inner rim adjacent the plurality of bearing pads, an outer rim and a damper bridge radially and concentrically interposed between the inner and outer rims, the damper bridge having an axial length that is less than an axial length of the plurality of bearing pads and the outer rim, thereby forming a damper cavity on each side of the damper bridge; an integral wire mesh damper situated within the damper cavity on each side of the damper bridge; and a plurality of integral centering springs located between the inner and outer rims.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
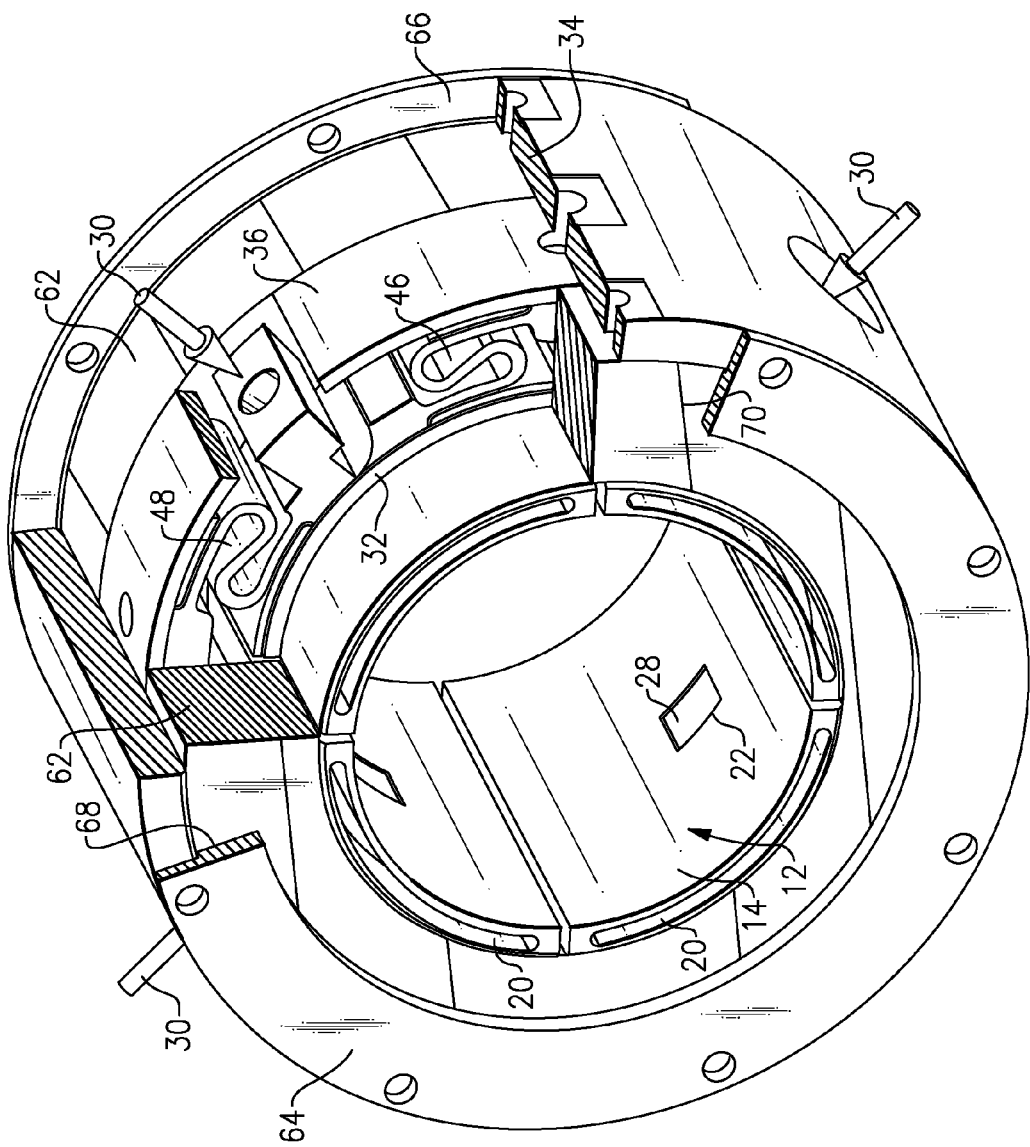
FIG. 1 is a partial cross-sectional perspective view of a compliant hybrid gas journal bearing assembly according to an embodiment of the invention.
Figure 5:
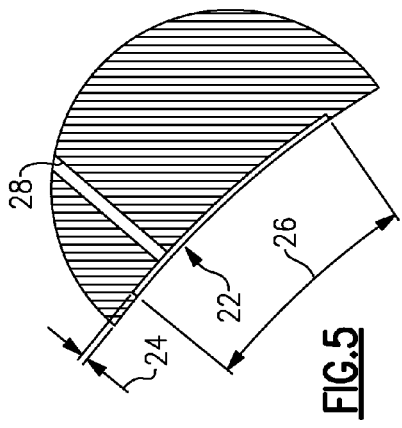
FIG. 5 is an enlarged cross-sectional view of a hydrostatic recess and a capillary restrictor of the bearing housing midspan section of FIG. 4.
Figure 2:
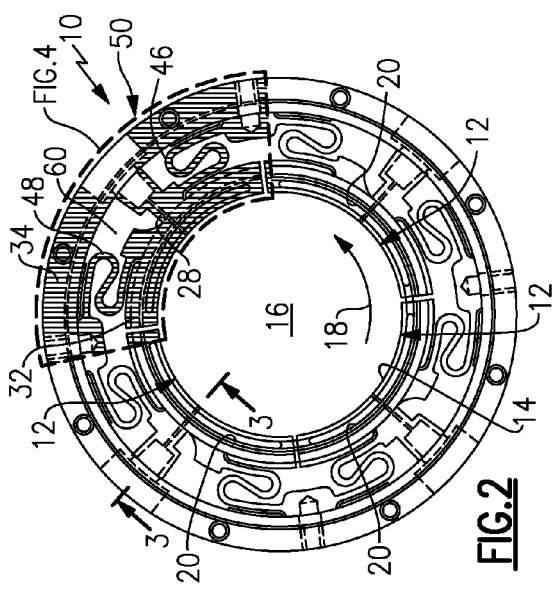
FIG. 2 is an end view of the compliant hybrid gas journal bearing housing of FIG. 1.

Referring to the drawings wherein identical reference numerals denote the same elements throughout the various views, FIGS. 1-5 illustrate a compliant hybrid gas journal bearing, shown generally at 10, according to an embodiment of the invention. The bearing 10 includes a plurality of compliant hybrid bearing pads 12. Each bearing pad 12 includes a pad surface 14 proximate a rotating rotor or shaft 16 that typically rotates in the direction of the arrow 18. In one embodiment, the bearing pads 12 comprise tilt pads that have offset integral springs (FIG. 2). Each bearing pad 12 also includes an axial slot 20 for minimizing the weight of the bearing pad 12. The pad surface 14 of each bearing pad 12 also includes a hydrostatic recess 22 having a depth 24 and a width 26 (FIG. 5). For example, the hydrostatic recess 22 may have a depth which is 2 to 10 times the gas film thickness between the bearing surface 14 and the rotor surface. In the illustrated embodiment, the ratio of the area of the hydrostatic recess 22 to the area of the bearing surface 14 is about 0.027.

In general, the smaller the area of the hydrostatic recess 22 compared to the bearing surface area, the higher the bearing stability margin.

In one embodiment, the hydrostatic recess 22 is centrally located on each bearing pad 12, and therefore symmetrically located about the shaft 16. In another embodiment, the hydrostatic recess 22 is off-centered on the bearing pad 12. However, it is still possible that the hydrostatic recesses 22 may be symmetrically located about the shaft 16, even though the recesses 22 are off-centered on the bearing pads 12. Each hydrostatic recess 22 is in fluid communication with a capillary restrictor 28 for providing a flow of pressurized gas, such as air, and the like, to the bearing pads 12. Each capillary restrictor 28 is coupled to a source of pressurized gas 30 (FIG. 1), such as compressor bypass flow, and the like. In one embodiment, the capillary restrictor 28 is asymmetrically located with respect to the hydrostatic recess 22. In another embodiment, the capillary restrictor 28 is symmetrically located with respect to the hydrostatic recess 22. The pressurized gas provides a hydrostatic lifting force such that the shaft 16 will not be bottomed out during startup. In other words, the pressurized gas provides a lifting force so as to lift the shaft 16 off the bearing pads 12, even though the shaft 16 is not rotating. In one embodiment, the gas has a pressure in the range between about 30 psig to about 200 psig.

In another embodiment, the bearing 10 does not possess a hydrostatic recess 22, but only possesses a capillary restrictor 28 to the surface 14 of the bearing pad 12. The capillary restrictor 28 in this configuration can also be centered about axes 54, 58, or can be offset towards the leading edge of the bearing pad 12, making the location asymmetric respect to the axes 54, 58.

In the illustrated embodiment, the bearing 10 has four bearing pads 12 symmetrically located about the shaft 16 with each bearing pad 12 including a single hydrostatic recess 22 with a capillary restrictor 28. However, it will be appreciated that the invention is not limited by the number of bearing pads, recesses and capillary restrictors, and that the invention can be practiced with any desirable number of bearing pads, recesses and restrictors.

Figure 4:
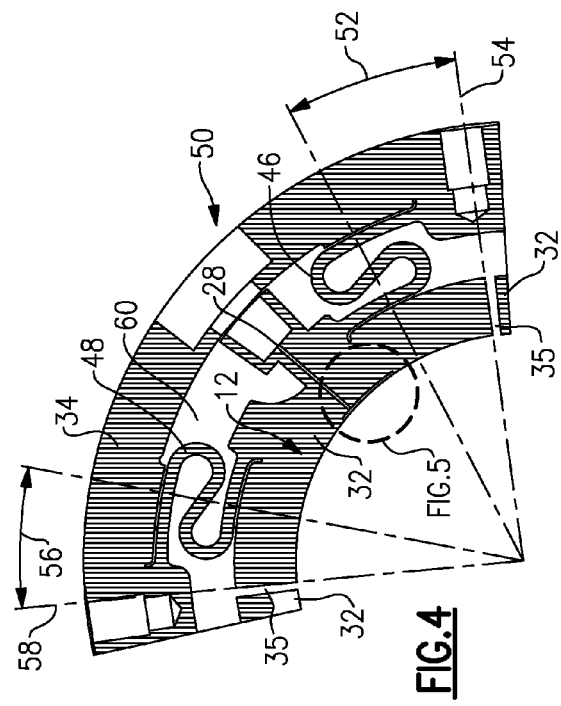
FIG. 4 is an enlarged cross-sectional view of the bearing housing midspan sector of the compliant hybrid gas journal bearing housing of FIG. 2.
Figure 3:
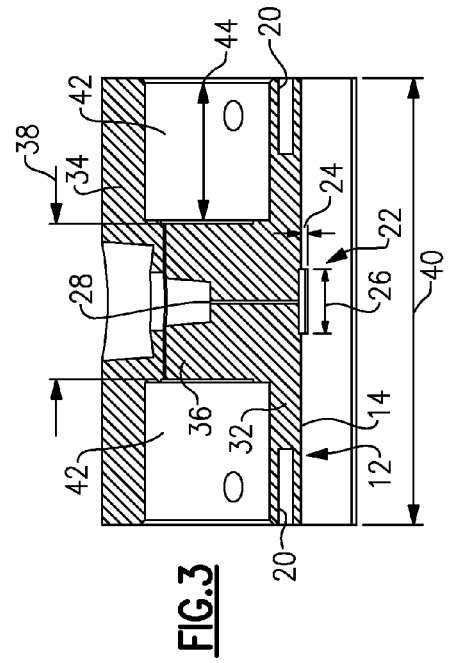
FIG. 3 is a cross-sectional view of the compliant hybrid gas journal bearing housing taken along line 3-3 of FIG. 2.

Referring to FIGS. 3 and 4, the bearing 10 includes an inner rim 32 adjacent the bearing pads 12, an outer rim 34 and a damper bridge 36 radially and concentrically interposed between the inner and outer rims 32, 34. A gap 35 partitions the inner rim 32 into a plurality of sectors 50, generally corresponding to the plurality of bearing pads 12. The damper bridge 36 has an axial length 38 that is less than an axial length 40 of the bearing pads 12 and the outer rim 34, thereby forming a damper cavity 42 having a width 44 on each side of the damper bridge 36.

One aspect of the invention is that the bearing 10 includes a plurality of integral centering springs 46, 48 located between the inner and outer rims 32, 34. In one embodiment, each sector 50 of the bearing 10 includes a pair of integral centering springs 46, 48; the spring 46 being a leading edge integral spring and the spring 48 being a trailing edge integral spring. In the illustrated embodiment, the integral centering springs 46, 48 generally have an "S" cross-section shape. The integral centering springs 46, 48 can be formed using wire electro-discharge machine (EDM) technology. A gap 60 between the bearing pads 12 and the outer rim 34 provides a clearance space for the springs 46, 48 to accommodate for the centrifugal and thermal effects generated for high speed, high temperature application. Also, the clearance space 60 reduces the bearing pad weight and overall weight of the bearing assembly. The integral centering springs 46, 48 provide a linear behavior, unlike the nonlinear behavior exhibited by conventional bump foil bearings. The integral centering spring design does not occupy any additional axial space beyond the axial length 40 of the bearing pads 12, unlike conventional squirrel cage designs that require additional axial length. An example of an oil-based, integral wire squeeze film damper is commercially available from KMC, Inc. (www.kmcbearings.com) of West Greenwich, R.I.

As shown in FIG. 4, the pair of springs 46, 48 for each sector 50 are offset with respect to the bearing pad 12 to generate a tilting pad motion or pad rotation, which has shown to profoundly enhance bearing stability and load capacity. In other words, the springs 46, 48 are asymmetrically located with respect to the bearing pad 12. Specifically, the centerline of the spring 46 forms an angle 52 with respect to a horizontal axis 54 of the sector 50, and the centerline of the spring 48 forms a smaller angle 56 with respect to a vertical axis 58, which is substantially perpendicular to the horizontal axis 54. Having the angle 56 less than the angle 52 generates a non-centered moment on the bearing pad 12, thereby creating a global tilting or rotation of the bearing pad 12. In an embodiment, the difference in the angles 52, 56 may be in the range between about 10 degrees and about 25 degrees. For example, the angle 52 may be about 28 degrees and the angle 56 may be about 18 degrees, or a difference of about 10 degrees. In addition, the difference in the angles 52, 56 allows the bearing pads 12 of the bearing 10 to be radially and rotationally compliant to allow for radial growth of the bearing bore produced from the centrifugal and thermal effects generated for high speed, high temperature applications. In the illustrated embodiment, the bearing 10 has four sectors 50 with a pair of springs 46, 48 in each sector. However, it will be appreciated that the invention can be practiced with any desired number sectors and any desired number of springs in each sector depending on the load and required stiffness for the particular application.

As described above, the asymmetric location of the integral springs 46, 48 and the asymmetric location of the hydrostatic recess 22 produces a global tilting or rotation of the bearing pad 12. However, the global tilting or rotation of the bearing pad 12 can also be accomplished by providing the leading edge integral spring 46 with a relatively lower radial stiffness than the trailing edge integral spring 48. For example, the leading edge integral spring 46 may have a radial stiffness of about 75,000 lb/in, while the trailing edge integral spring 48 may have a radial stiffness of about 85,000 lb/in. This difference in the radial stiffness between the springs 46, 48 causes a global tilting or rotation of the bearing pad 12.

Another aspect of the invention is that the bearing 10 includes an oil-free integral wire mesh damper (IWMD) 62 situated within the damper cavity 42 on each side of the damper bridge 36. In other words, the IWMD 62 is situated between the bearing pads 12 and the outer rim 34, as shown in FIG. 1. The IWMD 62 is a knitted wire mesh comprising a metal wire or plastic strand knitted into a mesh structure. The knitting process produces mesh of interlocking loops. These loops can move relative to each other in the same plane without distorting the mesh, giving the knitted mesh a two-way stretch. Because each loop acts as a small spring when subjected to tensile or compressive stress, knitted metal has an inherent resiliency. Knitted metal also provides high mechanical oil-free damping characteristics and non-linear spring rates. Vibration and mechanical shock can be effectively controlled to eliminate the violent resonant conditions and provide ample protection from dynamic overloads. Studies indicate that the IWMD 62 provides at least thirty times the damping as compared to a conventional air foil bearing. The IWMD 62 can be made from a variety of materials, such as steel, Inconel, aluminum, copper, tantalum, platinum, polypropylene, nylon, polyethylene, and the like. The density and dimensions of the IWMD 62 can be adjusted to meet a particular design application. An example of a wire mesh damper is commercially available from Metex Corporation (www.metexcorp.com) of Edison, N.J.

There are significant differences between the compliant hybrid gas journal bearing 10 of the invention and conventional bearing assemblies. As mentioned above, a conventional oil-based integral wire squeeze film damper is commercially available from KMC, Inc. of West Greenwich, R.I. The KMC integral wire squeeze film damper (ISFD) that uses "S" springs is a bearing support where the damping is derived from displacing a fluid from one control volume to another. This movement of the fluid through a clearance space or orifice creates "fluid based" viscous dissipation, which is realized as damping in the bearing support system. Usually, the squeeze film fluid is same as the lubricating fluid of the rolling element bearing or journal bearing that the ISFD is assembly with. In the conventional ISFD flexure pivot bearing assembly, the symmetrically positioned "S" springs allow radial movement of each inner rim quadrant, which has a flexure pivot bearing pad. The flexure pivot allows the bearing pad to pivot or rotate about the base of the flexure pivot beam. Therefore, the "S" springs provide radial compliance, whereas the rotational compliance or bias in the bearing pad is achieved through the flexure pivot. Each feature, the flexure pivot and the "S" spring, has a single function.

By contrast, the compliant hybrid journal bearing 10 using integral wire mesh dampers 62 does not generate damping through squeezing or displacing a fluid, rather the damping is generated through a mechanical structure, namely the wire mesh dampers 62. The lubricating fluid in the bearing 10 of the invention is gas and provides no viscous dissipation or damping in the bearing support, the damping comes from hysteretic structural damping in combination with coulomb friction. The structural damping comes from the thousands of individual wire segments bending together in unison and the coulomb friction comes from the micro-sliding of the wires on one another. This combination provides an excellent oil free source of damping, especially for machines that require or that can benefit from oil-free operation. An advantageous feature of the compliant hybrid journal bearing 10 using integral wire mesh dampers 62 is the fact that the radial compliance and rotational compliance functions are achieved through just the "S" springs 46, 48. This is because the "S"' springs 46, 48 in the invention are not symmetrically located about each quadrant or sector 50 of the inner rim 32. The asymmetrically positioning the "S" springs 46, 48 gives a rotational bias in the individual bearing pads 12, allowing rotation in addition to radial translation. In addition to having one feature perform dual functions, another advantage is that the occupied radial space is reduced because the nonexistence of the flexure pivot, which decreases weight of the bearing. This is paramount in aerospace applications, as weight is a primary driving factor for performance. Further reducing the weight of the bearing comes from EDM machining the material between the "S" springs 46, 48.

The bearing 10 also includes a pair of end plates 64, 66 that provide damper compression lands 68, 70, respectively, to prevent unwanted axial movement of the IWMD 62 and also can be used to tune the stiffness and damping coefficients depending on the level of end plate compression.

The compliant hybrid gas journal bearing 10 of the invention can be used in several modes of operation. One mode of operation is a purely hydrodynamic mode of operation. In this simplest mode of operation, the compliant gas bearing using integral wire mesh dampers possesses complaint pads with no hydrostatic capability. This mode of operation would be applicable to situations were a surplus pressurized gas was unattainable. This mode of operation creates pressure between the complaint pads and rotor through hydrodynamics. In this mode of operation, the bearing pads will lift off of the rotor surface at the corresponding rotor speed for the given load. However, a transient rub region exists before the hydrodynamics take effect and the bearing pads lift off.

Another mode of operation consists of a transition from hydrodynamic operation to a hybrid (hydrodynamic and hydrostatic) operation. This mode would exist, for example, when the external hydrostatic pressurization is not available during start up and this initial operating regime is dominated by hydrodynamics. In this situation, a transient rub region exists where there is sliding friction between the rotor surface and bearing pad surface. Eventually, the bearing pads lift off from hydrodynamics. Hydrostatics to each bearing pad would start to initiate at a certain speed and would most likely be powered through bleeding pressurized gas from the primary working fluid in turbomachinery stages. At this point, the bearing is operating in a hybrid mode.

Another mode of operation is a transition from a hydrostatic operation to a hybrid operation. This situation would exist, for example, when pressurized gas is available through the entire operating sequence of the machine. Having pressurized gas before rotor rotation is advantageous because the gas prevents transient rubbing, reduces start-up torque, and can allow safe shutdown in emergency situations such as stall. In this mode of operation, the bearing pads would lift the rotor without rotation, which is pure hydrostatics. As the rotor increases speed, the contribution from hydrodynamics becomes more predominant. At high speeds, hybrid operation is reached.

As described above, the compliant hybrid gas journal bearing 10 of the invention provides an oil-free bearing design that addresses the low damping and low load capacity characteristics that are inherent in present day air foil bearing designs. In addition, the compliant hybrid gas bearing of the invention provides much higher damping (30 times or more), significantly more load capacity and significantly higher manufacturing repeatability than conventional foil bearing technology. Further, the oil-free gas bearing of the invention offers significant cost savings as compared to fluid film or oil-based damper designs.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A compliant hybrid gas journal bearing, comprising:
a plurality of compliant hybrid bearing pads;
a non-rotating inner rim adjacent the plurality of bearing pads, an outer rim and a damper bridge radially and concentrically interposed between the inner and outer rims, the damper bridge having an axial length that is less than an axial length of the plurality of bearing pads and the outer rim, thereby forming a damper cavity on each side of the damper bridge; and
an integral wire mesh damper situated within the damper cavity on each side of the damper bridge.

2. A bearing according to claim 1, further comprising a plurality of integral centering springs located between the inner and outer rims.

3. A bearing according to claim 2, wherein the plurality of integral centering springs have an "S" cross-sectional shape.

4. A bearing according to claim 2, wherein a gap partitions the inner rim into a plurality of sectors that generally correspond to the plurality of bearing pads.

5. A bearing according to claim 4, wherein each sector includes a pair of integral centering springs.

6. A bearing according to claim 5, wherein one of the pair of integral centering springs forms a first angle with respect to a horizontal axis of the bearing, and wherein the other one of the pair of integral centering springs forms a second angle with respect to a vertical axis of the bearing, and wherein the first angle is different than the second angle.

7. A bearing according to claim 5, wherein one of the pair of integral centering springs has a first radial stiffness, and wherein the other one of the pair of integral centering springs has a second radial stiffness being different than the first radial stiffness.

8. A bearing according to claim 1, wherein each bearing pad further includes a pad surface with a hydrostatic recess having a depth and a width.

9. A bearing according to claim 8, further comprising a capillary restrictor in fluid communication with the hydrostatic recess for providing a flow of pressurized gas to the bearing.

10. A bearing according to claim 9, wherein the capillary restrictor is asymmetrically located with respect to the hydrostatic recess.

11. A compliant hybrid gas journal bearing, comprising:
a plurality of compliant hybrid bearing pads, at least one bearing pad including a hydrostatic recess and a capillary restrictor for providing a flow of pressurized gas; and
a non-rotating inner rim adjacent the plurality of bearing pads, an outer rim and a damper bridge radially and concentrically interposed between the inner and outer rims, the damper bridge having an axial length that is less than an axial length of the plurality of bearing pads and the outer rim, thereby forming a damper cavity on each side of the damper bridge.

12. A bearing according to claim 11, further comprising a plurality of integral centering springs located between the inner and outer rims.

13. A bearing according to claim 12, wherein the plurality of integral centering springs have an "S" cross-sectional shape.

14. A bearing according to claim 12, wherein a gap partitions the inner rim into a plurality of sectors that generally correspond to the plurality of bearing pads.

15. A bearing according to claim 14, wherein each sector includes a pair of integral centering springs.

16. A bearing according to claim 15, wherein one of the pair of integral centering springs forms a first angle with respect to a horizontal axis of the bearing, and wherein the other one of the pair of integral centering springs forms a second angle with respect to a vertical axis of the bearing, and wherein the first angle is different than the second angle.

17. A bearing according to claim 15, wherein one of the pair of integral centering springs has a first radial stiffness, and wherein the other one of the pair of integral centering springs has a second radial stiffness being different than the first radial stiffness.

18. A bearing according to claim 11, further comprising an integral wire mesh damper situated within the damper cavity on each side of the damper bridge.

19. A compliant hybrid gas journal bearing, comprising:
- a plurality of compliant hybrid bearing pads, at least one bearing pad including a hydrostatic recess and a capillary restrictor for providing a flow of pressurized gas;
- a non-rotating inner rim adjacent the plurality of bearing pads, an outer rim and a damper bridge radially and concentrically interposed between the inner and outer rims, the damper bridge having an axial length that is less than an axial length of the plurality of bearing pads and the outer rim, thereby forming a damper cavity on each side of the damper bridge;
- an integral wire mesh damper situated within the damper cavity on each side of the damper bridge; and
- a plurality of integral centering springs located between the inner and outer rims.

20. A bearing according to claim 19, wherein a gap partitions the inner rim into a plurality of sectors that generally correspond to the plurality of bearing pads.

21. A bearing according to claim 20, wherein each sector includes a pair of integral centering springs.

22. A bearing according to claim 21, wherein one of the pair of integral centering springs forms a first angle with respect to a horizontal axis of the bearing, and wherein the other one of the pair of integral centering springs forms a second angle with respect to a vertical axis of the bearing, and wherein the first angle is different than the second angle.

23. A bearing according to claim 21, wherein one of the pair of integral centering springs has a first radial stiffness, and wherein the other one of the pair of integral centering springs has a second radial stiffness being different than the first radial stiffness.

24. A bearing according to claim 19, wherein the capillary restrictor is asymmetrically located with respect to the hydrostatic recess.

* * * * *